(12) United States Patent
Bosisio et al.

(10) Patent No.: US 6,278,824 B1
(45) Date of Patent: Aug. 21, 2001

(54) OPTICAL CABLE WITH FILLING MATERIAL COMPRISING AN INTERNAL OLEFIN OLIGOMER

(75) Inventors: Claudio Bosisio, Brembate Sotto; Emilio Locatelli, Basiglio, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/317,642

(22) Filed: May 25, 1999

Related U.S. Application Data
(60) Provisional application No. 60/088,831, filed on Jun. 10, 1998.

(30) Foreign Application Priority Data

Jun. 5, 1998 (EP) .................................................. 98110353

(51) Int. Cl.[7] .................................................. G02B 6/44
(52) U.S. Cl. .................................................. 385/100
(58) Field of Search .................... 385/100–110, 147; 174/107, 120 R; 585/18, 10

(56) References Cited

U.S. PATENT DOCUMENTS

| | | | |
|---|---|---|---|
| 4,167,534 | * 9/1979 | Vincenzo et al. | 585/18 |
| 4,434,308 | * 2/1984 | Larkin et al. | 585/10 |
| 4,941,729 | * 7/1990 | Hardin et al. | 385/107 |
| 5,001,304 | * 3/1991 | Hardin et al. | 174/107 |
| 5,187,763 | 2/1993 | Tu . | |
| 5,285,513 | 2/1994 | Kaufman et al. . | |
| 5,378,856 | * 1/1995 | Allen | 174/120 R |
| 5,455,881 | 10/1995 | Bosisio et al. . | |
| 5,748,823 | * 5/1998 | Nave | 385/113 |
| 5,911,023 | * 6/1999 | Risch et al. | 385/100 |
| 6,085,009 | * 7/2000 | Risch et al. | 385/109 |

FOREIGN PATENT DOCUMENTS

| | | |
|---|---|---|
| 0 541 007 A1 | 5/1993 | (EP) . |
| 0 612 345 B1 | 8/1994 | (EP) . |
| 0 811 864 A1 | 12/1997 | (EP) . |

OTHER PUBLICATIONS

T.S. Coolbaugh et al., "Polydecene–based Systems for Use in Fiber Optic Cable Floods: District Enhanced Stability Regimes for Low and High Molecular Weight Base Fluids", Polymer Preprints, 37 (1):473–474, (1996) XP–002081007.

D.W. Van Krevelen, "Properties of Polymers", Elsevier Science Publishing Company Inc., 3$^{rd}$ edition, pp. 230–231, (1990).

* cited by examiner

*Primary Examiner*—Akm E. Ullah
(74) *Attorney, Agent, or Firm*—Finnegan, Henderson, Farabow, Garrett & Dunner, L.L.P.

(57) ABSTRACT

The present invention relates to an optical fiber cable comprising a filling material and to the composition of said filling material. In particular, the filling composition according to the present invention comprises an internal polyolefin oligomer to provide an improved capacity for wetting the coating surfaces of the optical fibers which it comes into contact with, and provides better slip of the optical fibers embedded in the composition. The oligomers of the invention comprise internal polyolefins obtained by polymerizing two or more hydrocarbon monomeric units having at least one unsaturation distributed randomly along the whole hydrocarbon chain wherein a mixture of these monomeric units comprises a maximum of 10% of monomeric units having the double bond in the $\alpha$-position.

21 Claims, 4 Drawing Sheets

OPTICAL CABLE WITH FILLING MATERIAL COMPRISING AN INTERNAL OLEFIN OLIGOMER

Applicants, pursuant to 35 U.S.C. § 119, claim the benefit of the filing date of European patent application 98110353.4 filed Jun. 5, 1998. Applicants also claim the benefit of provisional application Serial No. 60/088,831 filed Jun. 10, 1998.

BACKGROUND OF THE INVENTION

1. Field of the Invention

The present invention relates to an optical fibre cable comprising a filling material and to the composition of said filling material.

2. Related Art

The task of the filling material in an optical fibre cable is to protect the fibres throughout their lifetime. To carry out this function, the filling material is generally introduced into the structures containing the optical fibres in such a way that the optical fibres are embedded in it.

The composition of known fillers typically comprises a base oil, for example of the silicone, mineral (naphthenic or paraffin) or synthetic type. This base oil typically requires the addition of a "viscosity improver" such as an elastomeric polymer with a low glass transition point, which by imparting viscosity to the solution improves its performance as a filling material. The filler composition may also contain an antioxidant and a thickening/thixotropic agent, consisting of more or less silanized pyrogenic silica.

There are various known types of cable which have suitable housings for the optical fibres, filled with a filling material.

For example, the patent EP 632301 describes an optical fibre cable comprising, in a suitable housing, the optical fibres embedded in a composition capable of protecting the fibres from phenomena of attenuation, in which the said composition comprises a hydrocarbon compound, a catalyst and a thixotropic thickener such as silica.

Another example of a filler composition is disclosed in patent application EP 811864, which describes a composition for fillers comprising a mineral oil or a polyalphaolefin, a block copolymer, an anti-oxidant and if necessary a stabilizer of the "metal deactivator" type.

Other examples of optical cables with known fillers are disclosed in U.S. Pat. Nos. 5,285,513 and 5,187,763 and in the patent EP 541007.

Optical fibre cables, when installed underground, for example in leads or inside underground conduits, are subject to damage affecting their coatings, caused by mechanical abuse of various kinds, for example accidental impact by sharp tools such as spades or pickaxes, which have a cutting action on the cable. The said conditions may lead to the ingress of water, with the worst possibility that it will run longitudinally inside the cable and consequently in the proximity of the optical fibres. One of the tasks of the filler is therefore to limit or impede this passage of water inside the cable structure. Less disastrous faults, such as breaks in the outer sheaths only, may also lead to permeation of water in the liquid or vapor state, with consequent harmful effects on the optical fibres, and the development of a number of problems (for example, the delamination of the layer of plastic coating of the optical fibres), the final outcome of which is manifested in optical attenuation of the transmitted signals.

SUMMARY OF THE INVENTION

The applicant has observed that, in order to limit the possibility of the coating of the optical fibre coming into contact with water, it would be desirable to use a filling material with a good wetting capacity by comparison with this coating, in such a way as to make it more difficult for water to enter the interface between the fibre coating and the filling composition.

In relation to the mechanical stresses to which the optical fibres may be subjected, it should also be observed that, even if the cable does not undergo movement once it has been laid, it is inevitably subject to thermal variations which cause differential dimensional deformations in the components of the cable structure, according to the different materials from which these components are formed. The applicant has observed that these deformations may cause movements of the optical fibre inside the structure in which it is housed, by acting through the filling material. If this filling material is not sufficiently deformable during the passage of the optical fibre, the structure of the latter may be subject to excessively high localized pressures; this may cause the well-known phenomena of "micro-bending" in the fibre, which are one of the causes of attenuation of the optical signal.

The applicant has now discovered a new composition which can be used advantageously as a filling material for optical cables.

The filling composition according to the present invention not only maintains the desired characteristics of the known fillers, but also has a number of characteristics which make it possible to improve the compatibility of the fibres with the filling material and the intrinsic properties of this filler, both in terms of ease of processing and in terms of performance when the cable is in use.

DETAILED DESCRIPTION

Figure 1:
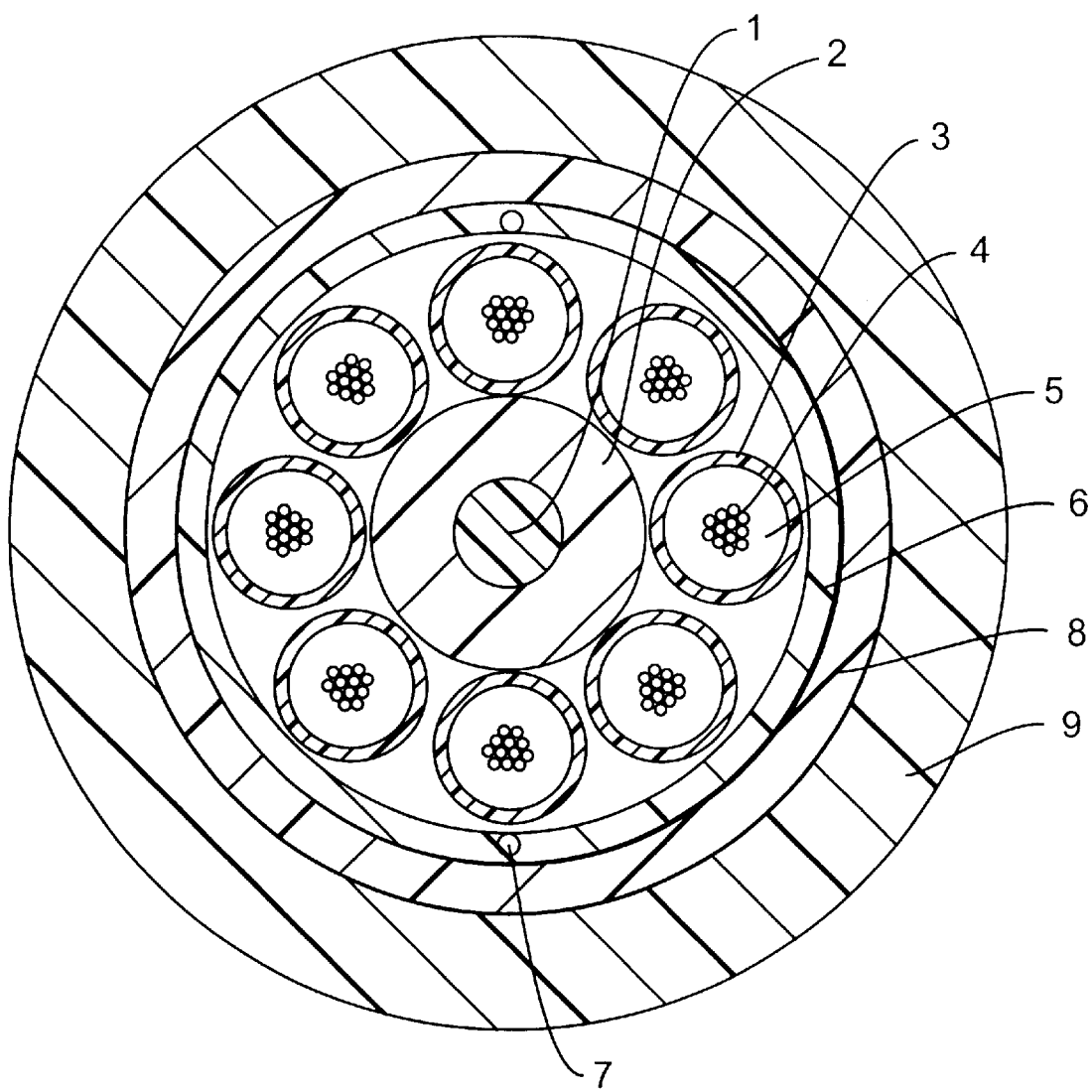
FIG. 1 shows schematically, a section through an optical fibre cable of the multiple-tube type with a central support, according to the invention.

In particular, the applicant has observed that a filling material according to the present invention has an improved capacity for wetting the coating surfaces of the optical fibres with which it comes into contact, and has less resistance to the movement of the optical fibres within this filling material. For the purposes of the present invention, the term "wetting" denotes the capacity of the filler to adhere to the surfaces of the optical fibres, which are generally coated with acrylic materials; the result of this improved wetting capacity is a greater resistance to water permeation, since the ingress of water into the acrylate/filler interface is made more difficult.

The applicant has also observed that the use of a filling material according to the present invention causes less resistance to the movement of the optical fibres when these move inside it.

According to the applicant's observations, the smaller resistance to the movement of the optical fibres inside the filling material makes it possible to reduce the problems associated with the mobility of the said fibres, thus reducing or eliminating "micro-bending" phenomena which may occur during the movement of the cable during laying or when the cable is in use.

The applicant has also observed that the composition of a filling material according to the present invention has a reduced dripping tendency when inside the cable.

In the present description, the term "dripping" means the tendency of filling material to move inside the various structures forming the cable, both in a longitudinal and transversal direction.

Generally, an excessive movement of filling material inside the cable is undesirable, both during manufacturing and installation of the cable as well as when the same is under exercise.

During manufacturing of the cable for example, the filling material runs horizontally together with the cable, and it should thus preferably have a relatively high dripping resistance in order to avoid incomplete filling of the cable.

In addition, when on exercise, the cable can be placed in locations with high slopes so that the filling material should preferably have a relatively high dripping resistance in order to avoid the flowing of said filling material towards junction boxes or even towards devices connected therewith.

The flowing resistance of the material, that is strictly related to the dripping resistance, is thus a further advantageous property of the filling material according to the present invention, which can be appreciated both during manufacturing and installation of the cable.

One aspect of the present invention therefore relates to an optical cable comprising at least one optical fibre and a filling material, characterized in that the said filler comprises an internal polyolefin.

In the present description, the term "internal polyolefin" means the product of polymerization of two or more hydrocarbon monomeric units having at least one unsaturation distributed randomly along the whole hydrocarbon chain, in which a mixture of these monomeric units to be polymerized comprises a maximum of 10% of monomeric units having the double bond in the a position; preferably, these monomeric units are mono-unsaturated hydrocarbons.

A preferred aspect of the present invention relates to a cable as described previously, in which this filling composition is in contact with the said at least one optical fibre.

According to a further preferred aspect, the quantity of internal polyolefin in the filler is between 30% and 98% by weight, preferably between 45% and 95% by weight.

In a preferred embodiment, this internal polyolefin is produced by polymerization of unsaturated hydrocarbon monomers, each comprising from 10 to 20 carbon atoms.

In particular, this internal polyolefin is preferably produced by the polymerization of monomers with chains each comprising from 12 to 18 carbon atoms and even more preferably from 15 to 16 carbon atoms.

Preferably, this internal polyolefin is an oligomer comprising from 2 to 4 monomeric units as defined above.

According to a preferred aspect, this internal polyolefin is a mixture of polyolefins with different molecular weights.

In particular, these mixtures are mixtures of oligomers comprising from 2 to 4 monomeric units as defined above.

A further aspect of the present invention relates to an optical cable as described previously, in which the filling composition also comprises a thickening polymer, this thickening polymer being preferably selected from block copolymers of the type which comprises styrene, propylene and ethylene units.

Another preferred aspect of the present invention relates to an optical cable as described previously, in which the internal polyolefin included in the filling composition is partially replaced by a mineral oil. In particular, the mineral oil can replace up to approximately 70% by weight of the internal polyolefin, preferably from 20% to 60% by weight, a replacement of approximately 50% by weight of the internal polyolefin being particularly preferred.

The present invention will be more clearly understood from the following detailed description, provided by way of example and consequently without restriction, with reference to the attached drawings, in which:

The cable shown in FIG. 1 has in the radially innermost position a reinforcing element, typically made from glass-fibre reinforced plastic (1), coated with a polymeric layer (2), of polyethylene for example. The cable has one or more tubular elements (3) made from PE, PBT or PP, embedded in the filler (5), comprising the optical fibres (4) which are also embedded in the filler (5). The tubular elements (3) are wrapped in a reinforcing layer (6), typically made from Kevlar or glass thread, containing two sheath cutting threads (7) disposed longitudinally with respect to the cable. Finally, the cable comprises a corrugated tape (8) and an outer sheath (9), typically made from polyethylene.

Figure 2:
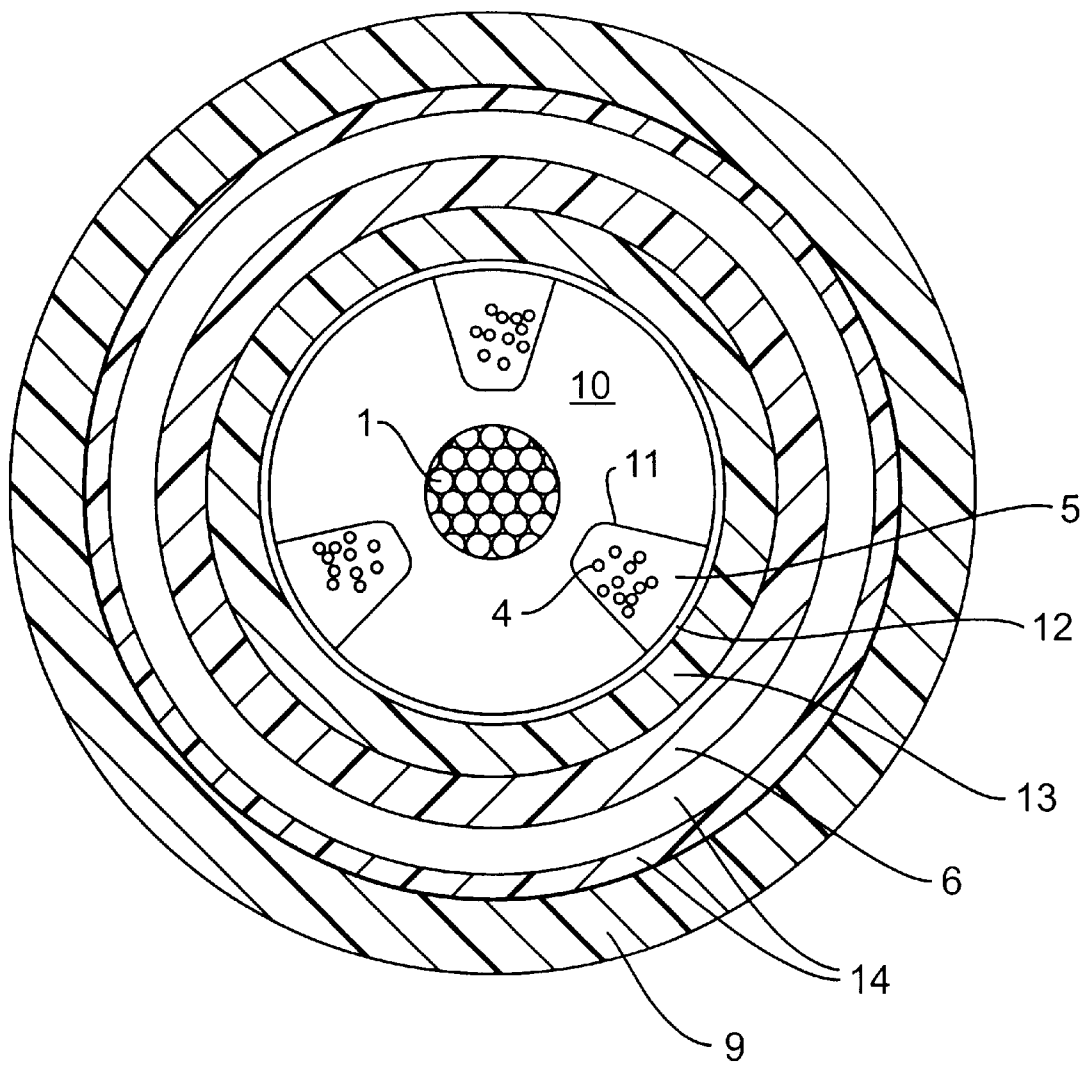
FIG. 2 shows schematically a section through another optical fibre cable according to the invention, with a grooved core.

FIG. 2 shows another example of an optical fibre cable.

As shown in FIG. 2, the cable has in the radially innermost position a reinforcing element (1) on which is extruded the grooved core (10) in which are externally formed grooves (11) which extend either spirally or with an s-z configuration along the whole outer surface of the said core.

The grooves (11) are filled with a filler (5) according to the present invention, and house the optical fibres (4).

The grooved core (10) is then wrapped in a layer of filler (12), which covers the grooves and which in turn is surrounded by a polyurethane sheath (13) and by a reinforcing tape (6). The final layers are a two-layer corrugated tape (14) and an outer polyethylene sheath (9).

Figure 3:
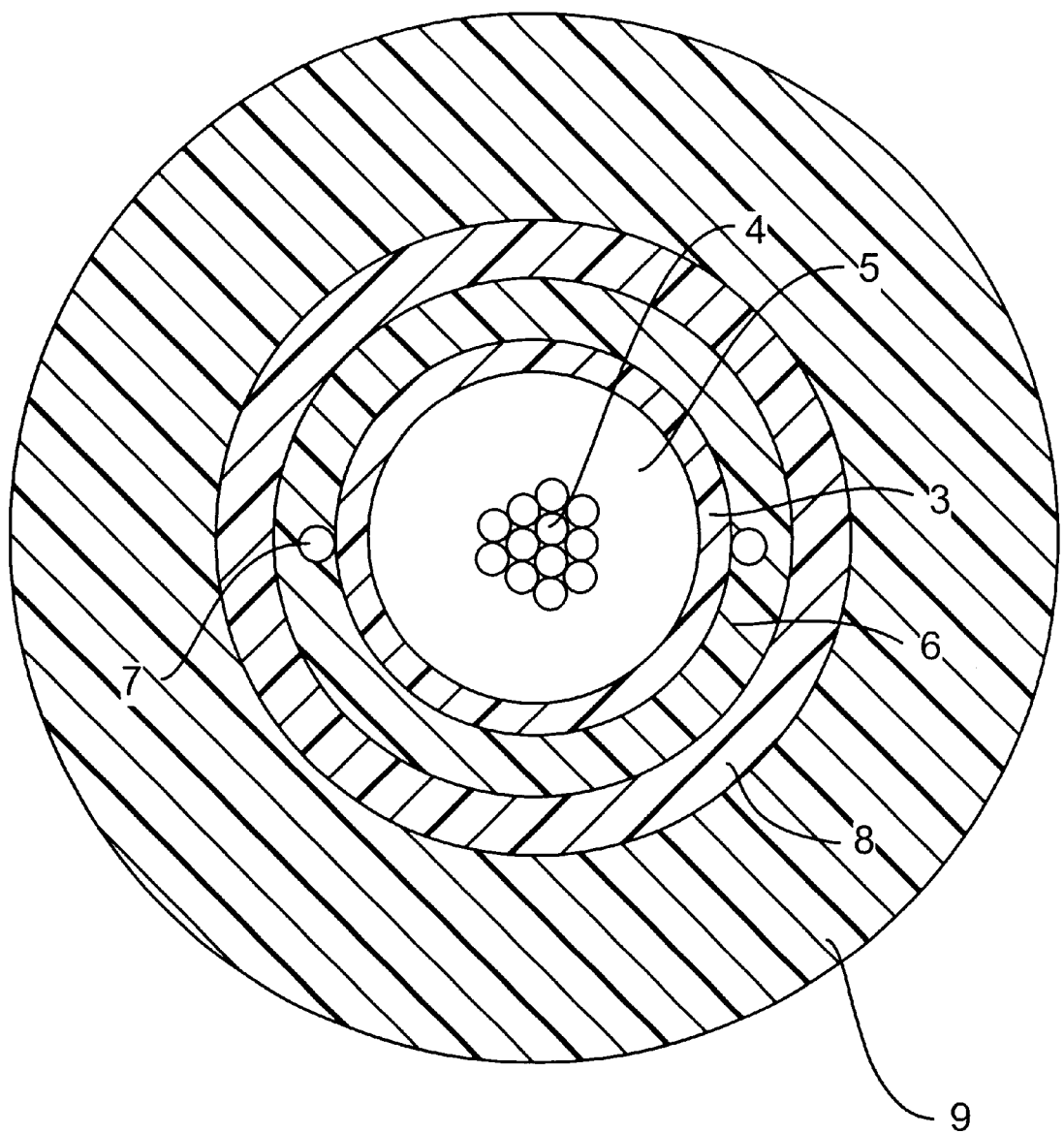
FIG. 3 shows schematically a section through another optical fibre cable according to the invention.

FIG. 3 shows a sectional view of an optical fibre cable comprising a central tube (3), containing the optical fibres (4) which are preferably disposed loosely in the filling material (5). The central tube (3) is wrapped, in sequence from the tube outwards, with a reinforcing layer (6) containing two sheath cutting threads (7), a corrugated tape (8), and an outer polyethylene sheath (9).

Figure 4:
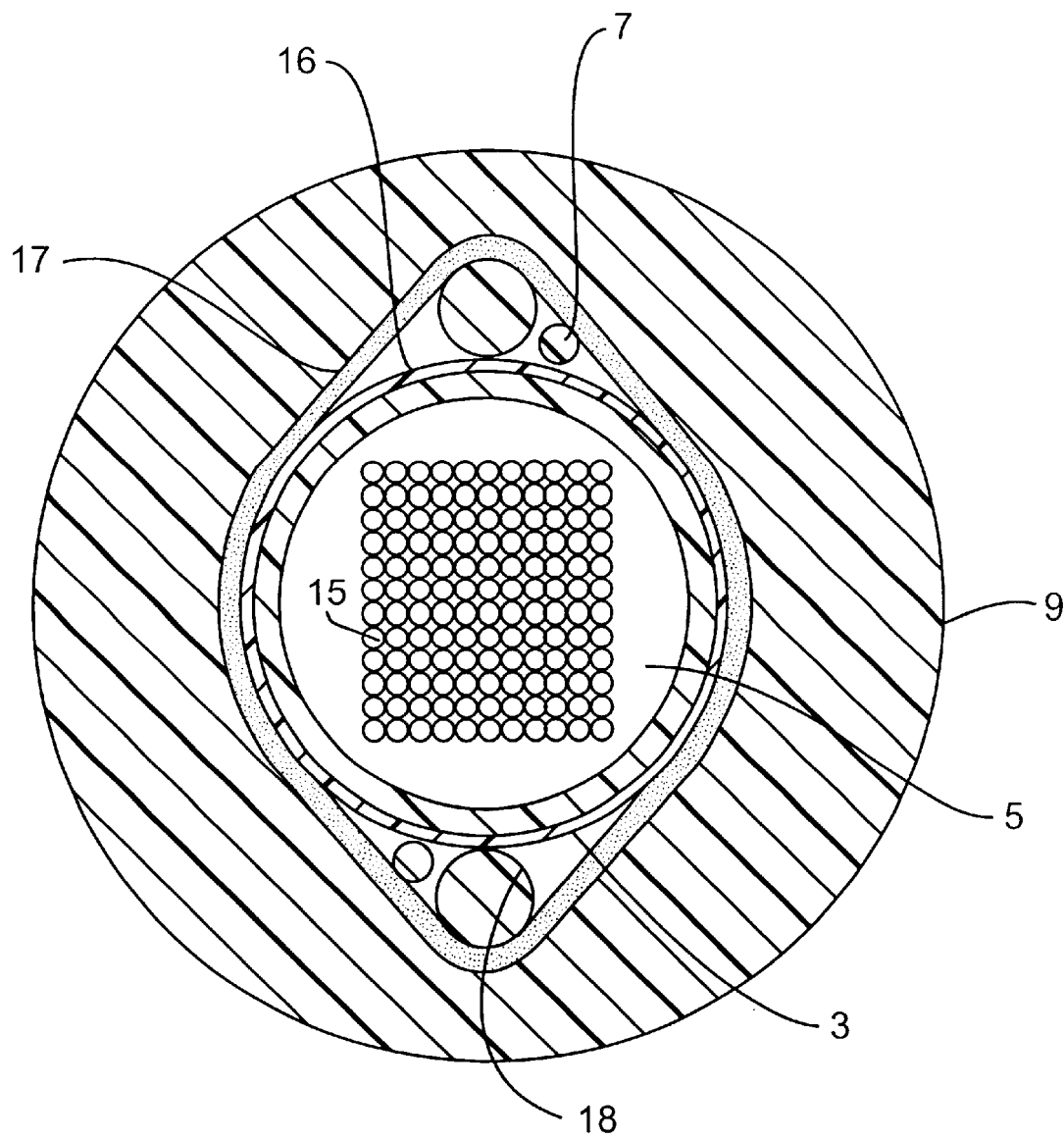
FIG. 4 schematically a section through another optical fibre cable according to the invention.

FIG. 4 shows another example of an optical fibre cable comprising a central tube (3) in which are housed optical fibre ribbons (15), preferably embedded in the filling material (5). The central tube (3) is wrapped with a water swellable layer (16) and with a containing tape (17) typically made from polyester, between which tapes are contained the sheath cutting threads (7) and the reinforcing rods (18) made from glass-fibre reinforced plastic.

The optical fibre cables as described previously solely by way of example may also comprise a water swellable tape disposed outside the tube and in any case outside the elements containing the optical fibres, with the function of further improving the resistance of the structure to the propagation of water in the longitudinal direction inside the cable.

The filling composition according to the present invention can be used advantageously as a filler in the cables illustrated in FIGS. 1, 2, 3 and 4, particularly when this filler is in direct contact with the optical fibres.

The filling material to which the present invention relates is characterized in that it comprises an internal polyolefin.

The composition of the filler according to the present invention typically comprises from approximately 30% to approximately 98% by weight, and preferably from 45% to 95% by weight, of internal polyolefins.

Internal polyolefins (hereinafter also denoted by the acronym "PIO"), which can be used advantageously to prepare a filling composition according to the present invention, are mixtures of oligomers, typically dimers, trimers and tetramers, which can be produced, for example, by the polymerization of two or more n-olefinic monomeric units, each containing one unsaturation, this unsaturation being distributed in a statistical way along the whole chain. These n-olefinic monomeric units are preferably formed by chains each containing from 10 to 20 carbon atoms.

Preferably, the oligomeric chains are derived from n-olefinic monomeric units, each of which contains a single unsaturation, this unsaturation being distributed statistically along the whole chain.

Typically, the mixtures of initial monomers for preparing polyolefinic oligomers usable in the filling composition according to the present invention contain not more than 10% α-olefins, in other words n-olefins having a double bond in the α position of the chain.

U.S. Pat. No. 4,167,534 describes a suitable method of preparing these polyolefins.

According to this patent, the initial n-olefinic monomers are produced by dehydrogenation of n-paraffin by a process known as the PACOL-OLEX process.

These n-olefinic monomers are then polymerized by a catalytic autocondensation reaction.

The polymerization product is then distilled to separate the fractions having different ranges of molecular weight; the fractions pre-selected by the applicant allow for the requirements of the final filling composition, which should preferably have a viscosity of between 70 and 120 Pa.s (measured with a "shear rate" of 1.5 s$^{-1}$ at 25° C.), compatibly with a pour point of less than −40° C.

The process is completed by a stabilization of the products by catalytic hydrogenation.

According to what has been stated above, in the case of monomers each containing from 10 to 20 carbon atoms the initial monomeric unit can be defined by the following formula:

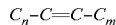

where:

$0 \leq m \leq 17$ $0 \leq n \leq 17$ $8 \leq m+n < 18$ preferably with the use of monomeric mixtures containing less than 10% α-olefins, in other words n-olefins with a double bond in the α position.

The applicant has also observed preferred results when using the mixture of oligomers (dimers, trimers, tetramers, and mixtures of these) produced by polymerizing monomeric units according to the above formula where n+m is in the range from 10 to 16, in other words where chains with 12 to 18 carbon atoms are present.

Oligomers produced by polymerizing monomers each having 15 to 16 carbon atoms proved to be particularly advantageous.

Preferably, these mixtures of polyolefin oligomers have a weight average molecular weight in the range from approximately 400 to approximately 600.

The mixtures of oligomers used by the applicant were selected according to the effects which the various oligomers have on certain fundamental performances of the final mixture.

An increase of the content of tetramers with respect to the content of dimers typically causes an increase in viscosity, in the pour point and in the flash point, and also results in a reduction in vapor pressure and consequently a lower volatility of the mixture.

This is because the internal polyolefins used for the preparation of the invention are characterized by a high viscosity index, a limited reduction of viscosity with an increase in temperature, low volatility and high thermal stability.

Preferably, these internal polyolefins have a viscosity in the range from 15 to 400 mPa.s at 40° C., and a viscosity in the range from 1 to 40 mPa.s at 100° C.

According to another advantageous characteristic, the pour point of the internal polyolefins used in the filling composition according to the invention is preferably in the range from −100° C. to −40° C.

The term "pour point" denotes the lowest temperature at which the oil can still be made to move, when conditioned to the temperatures under investigation, according to the ASTM D97 standard (standards drawn up by the Institute of Electrical and Electronics Engineers, New York, USA).

Another advantageous characteristic of these polyolefins is an index of viscosity preferably lying in the range from approximately 120 to 160.

These internal polyolefins also preferably have a density, measured at 15° C., in the range from approximately 0.820 to approximately 0.835 kg/dm$^3$.

Examples of polyolefins which can be used advantageously to prepare a filling composition according to the invention are the products marketed by MixOil under the trade names MX 2104, MX 2106 and MX 2108. These products are typically mixtures of oligomers produced by polymerization of monomers having from 15 to 16 carbon atoms, whose typical distribution of dimers, trimers, tetramers and higher oligomers is shown in Table I.

TABLE I

| Composition of some commercially available mixtures of internal polyolefins | | | |
|---|---|---|---|
| % by weight | MX 2104 | MX 2106 | MX 2108 |
| DIMERS | 94 | 67 | 42 |
| TRIMERS | 6 | 26 | 43 |
| TETRAMERS AND HIGHER OLIGOMERS | — | 7 | 15 |

The mixture forming the filler may comprise, in addition to the internal polyolefins defined above, mineral oils, and in particular refined naphthenic oils which may advantageously partially replace the internal polyolefins in the filling mixture.

Preferably, these mineral oils have a viscosity in the range from approximately 4 to 60 mPa.s at 40° C. and a viscosity in the range from approximately 1.5 to 7 mpa.s at 100° C.

These mineral oils also have a pour point which is preferably in the range from approximately −60° C. to approximately −25° C.

The abovementioned refined mineral oils primarily make it possible to produce a more economical filler, without any change in the properties of the final mixture, of which properties the fundamental one is compatibility, in the sense of chemical inertness, with the plastic materials which are contacted.

Oils suitable for the requirements are typically of the low-viscosity naphthenic type, which have a pour point below −40° C.; typical examples may be the products Nytex 800 and Nytex 810 and Nyflex 800 and Nyflex 810 manufactured by Nynas.

Typically, the proportion of mineral oil contained in the filling mixture varies from 0% to 70% by weight, and preferably from 20% to 60% by weight, a variation from 45% to 50% being particularly preferred. The total proportion of base oil, whether based on PIO only or formed by a mixture of PIO and mineral oil, within the total weight of the filling composition will typically be in the range from approximately 80% to 98% by weight, and preferably from approximately 85% to 95% by weight.

A "viscosity improver", in other words an elastomeric substance capable of imparting a sufficiently high viscosity to the fluid oil base, may advantageously be added to the PIOs as such and also to mixtures of PIO and mineral distillation oils.

The viscosity imparted to the final compound is typically in the range from approximately 70 to approximately 120 Pa.s, measured with a shear rate of $1.5 \text{ s}^{-1}$ at 25° C.

The added elastomer which acts as a viscosity improver must have a high solubility in the oil, and has a very stable chemical structure, a considerable thickening capacity, even at low concentrations, and a high capacity for imparting adhesive and cohesive properties to the solution.

Among the various possible elastomers, the use of a block copolymer of the SEP type, in other words a block copolymer based on styrene-ethylene-propylene, was found to be particularly advantageous. Typically, these copolymers have a weight average molecular weight in the range from approximately 60,000 to approximately 200,000. The proportion of these materials in the total weight of the filling mixture is preferably in the range from 3% to 20%. The person skilled in the art is capable of selecting the quantity of these copolymers in a suitable way to obtain the desired viscosity, on the basis of the fact that, typically, a quantity of polymer with a high molecular weight makes it possible to obtain a higher viscosity than an equal quantity of a similar polymer having a lower molecular weight.

Examples of materials which may be used advantageously for this purpose are the commercial products Kraton G1701 and Kraton G1702 manufactured by Shell Chemical.

A further component added to the mixture normally consists of an antioxidant, for example one of the type sold under the trade name Irganox 1010, Irganox 1076 (Ciba-Geigy), which adequately protect the filler from the thermal aging which takes place during the lifetime of the cable, as well as during the hot preparation of the filler.

The filling composition according to the invention can be used favourably to impede the longitudinal propagation of water in various cable structures. In particular, the composition can be used advantageously in direct contact with the optical fibres, for example when injected into the rigid coatings which contain them.

Optionally, pyrogenic silica, which can further thicken the filling mixture and make it thixotropic, may also be added to the filling composition according to the invention.

The following examples will further clarify the particularly advantageous aspects of the present invention.

EXAMPLE 1

Preparation of the filling composition according to the invention and of the comparative compositions The following materials were used for the preparation of the fillers according to the invention:

MX 2106 and MX 2108 internal polyolefins;

KRATON G1701 and G1702 thickener;

IRGANOX 1010 antioxidant;

NYFLEX 800 and 810 naphthenic oil.

The poly-α-olefins used by the applicant for the comparative tests described below are the NEXBASE™ 2006 and NEXBASE™ 2008 products manufactured by Nynas.

The apparatus used consists of a reactor, with a capacity from 1500 to 2000 liters, provided with a multiple-blade variable-speed agitator, capable of operating at temperatures of up to 130° C. at least.

The base oil, in suitable measured amounts, is placed in the cold reactor together with the antioxidant, and agitation is carried out at between 150 and 200 r.p.m. in such a way that the mixture is adequately stirred.

The elastomer, after being measured and comminuted, and preferably ground, is then added, this operation being supervised carefully in order to prevent the formation of lumps of elastomeric thickeners.

When a satisfactory dispersion has been achieved, the reactor is subjected to the experimentally determined temperature (130° C. in the case of the oil base consisting of MX 2108 or NEXBASE™ 2008 only, 120° C. in the case of MX 2106 only or of NEXBASE™ 2006 and mixtures of these with NYFLEX 810 oils, 105° C. for the base oil MX 2106 or NEXBASE™ 2006 if mixed with NYFLEX 800 oil).

As soon as the specified temperature is reached, the agitation is reduced, to match the temporary reduction of viscosity of the mixture, and as the dissolving progresses the agitation velocity should be gradually increased again.

As regards the duration of the dissolving, this depends on the operating temperature, being longer for a lower maintained temperature.

When the elastomer has been fully dissolved, the temperature of the mixture is lowered by approximately 20° C., and a vacuum is then created in the reactor, with continuing slow agitation of the mixture.

The next operation of degassing lasts for at least 30 minutes, a vacuum of several mbar being produced.

At this point, the material is collected in drums at temperatures of 70–80° C., care being taken not to create turbulences, resulting in incorporation of air, during the operation.

A filling composition (indicated by the number 1 in Table II) was prepared by mixing 87.8 parts of MX 2016, 11.8 parts of KRATON G1701 and 0.4 part of IRGANOX.

Similarly, another 6 compositions (2, 3, 4, 5 and 6) were prepared, using materials and quantities as shown in Table II.

In particular, two naphthenic oils were used in the compositions indicated by 5, 6 and 7 in Table II, starting from a composition of the oily base mixture consisting of PIO and naphthenic oils in a ratio of 1:1.

Table II, which shows the composition in detail of the various components of the 7 mixtures according to the invention, shows in the last line the viscosity of the filler measured with a shear rate of $1.5 \text{ s}^{-1}$ at 25° C.

TABLE II

Composition by weight for fillers according to the invention

| COMPONENT (%) | 1 | 2 | 3 | 4 | 5 | 6 | 7 |
|---|---|---|---|---|---|---|---|
| MX 2106 | 87.8 | 91.1 | | | | 45.5 | 45 |
| MX 2108 | | | 88.8 | 91.3 | 45.8 | | |
| NYFLEX 810 | | | | | 45.8 | 45.5 | |
| NYFLEX 800 | | | | | | | 45 |
| IRGANOX | 0.4 | 0.4 | 0.4 | 0.4 | 0.4 | 0.4 | 0.4 |
| KRATON G1701 | 11.8 | | 10.8 | | | | |
| KRATON G1702 | | 8.5 | | 8.3 | 8 | 8.6 | 9.6 |
| VISCOSITY γ 1.5 s$^{-1}$ (Pa · s) | 92 | 90.2 | 89.5 | 89.8 | 90 | 92.8 | 98 |

Three comparative filling compositions were prepared in a similar way to that described above, using polyalphaolefins instead of internal polyolefins. Table IIa shows the details of these compositions.

TABLE IIa

Comparative compositions comprising polyalphaolefins, by weight:

| COMPOSITION | 1 | 2 | 3 |
|---|---|---|---|
| NEXBASE ™ 2006 | 88.6 | 91.1 | — |
| NEXBASE ™ 2008 | — | — | 91.6 |
| KRATON G1701 | 11 | — | — |
| KRATON G1702 | — | 8.5 | 8 |
| IRGANOX 1010 | 0.4 | 0.4 | 0.4 |
| VISCOSITY γ 1.5 s$^{-1}$ (Pa · s) | 88.4 | 84.1 | 88 |

EXAMPLE 2
Measurement of the Wetting Capacity

The wettability of the acrylic coating of the optical fibres by the filling composition is essentially determined by the oil component of the said composition. The thickening component has no wetting capacity for practical purposes.

In order to evaluate the tendency of the material to adhere to the walls of the optical fibres, and consequently its wetting capacity, the "angle of contact" of the oil component only was measured at 25° C., and compared with the measured values for an internal polyolefin such as MX 2108 and for the similar poly-α-olefin NEXBASET™ 2008.

For this measurement, reference may be made to the publication by D. W. Van Krevelen, "Properties of polymers", published by Elsevier, pp. 230–231 (3rd edition).

Instruments made by Costech International S.r.l. were used to measure the angle of contact.

The measurement consists in depositing, with a microsyringe, a drop of the liquid under examination on a perfectly flat surface consisting of the material on which the interaction with the substance in question is to be evaluated, and waiting until the drop reaches a completely settled condition.

The angle of contact is defined as the angle formed by the tangent to the drop, generated at the point of contact of this drop with the surface on which it is placed, and the said surface, this angle being measured externally with respect to the surface of the drop.

The wetting capacity of the filler was evaluated according to the fact that smaller angles of contact indicate a greater wetting capacity of the liquid.

The values of the angle of contact measured relative to internal polyolefins and poly-α-olefins, at a temperature of 25° C., on a surface of dyed acrylates, which are the outermost coating materials of the optical fibre, repeated three times, are shown in Table III.

TABLE III

Measurement of the angle of contact

| | 1 | 2 | 3 |
|---|---|---|---|
| NEXBASE ™ 2008 | 48° | 49° | 49° |
| MX 2108 | 45° | 46° | 46° |

As will be seen from the results in Table III, the oil used according to the present invention (PIO) has a positive effect on the behaviour of the filling material, by improving the "wettability" of the coatings of the optical fibres.

The compositions identified by the applicant, comprising a synthetic oil based on internal polyolefins, therefore show, with respect to similar compositions based on poly-α-olefins, an improvement in relation to the wetting capacity, resulting in a greater resistance to water permeation, since the ingress of water into the acrylate/filler interface is made more difficult.

EXAMPLE 3
Measurements of Resistance to the Movement of the Fibers in the Filler An important aspect to which the present filler corresponds is the improved capacity which it has for making the optical fibres move within it.

The applicant has confirmed the improved capacity which the filler has for making the optical fibres move within it, by means of a test consisting in filling a V-shaped groove having a length of 1 m with a composition of the filler according to the present invention, embedding an optical fibre in the filler in the centre of the groove, connecting one end of the optical fibre to an Instrom dynamometer by means of a suitable return pulley, and monitoring the value of the energy required to extract a 100 mm portion of optical fibre under traction at a controlled velocity of 50 mm/min.

Table IV shows the results of this test, and demonstrates the lower extraction force to be applied to an optical fibre embedded in a filling composition according to the present invention by comparison with the force to be applied if this fibre is embedded in a known comparative composition.

TABLE IV

Extraction test of optical fibres.

| | Composition | | | |
|---|---|---|---|---|
| COMPONENT (%) | 1 | 2 | 3 | (comparative) |
| MX 2106 | 91 | 45.7 | 45 | |
| NEXBASE ™ 2006 | | | | 91.3 |
| NYFLEX 810 | | 45.7 | | |
| NYFLEX 800 | | | 45 | |
| KRATON G1702 | 8.6 | 8.2 | 9.6 | 8.3 |
| IRGANOX 1010 | 0.4 | 0.4 | 0.4 | 0.4 |
| VISCOSITY γ 1.5 s$^{-1}$ (Pa · s) | 84.4 | 83.5 | 88.4 | 81.7 |
| EXTRACTION ENERGY (mJ) | 12.7 | 15.9 | 14 | 18.2 |
| PERCENTAGE VARIATION with respect to the comparative sample | −30.22 | −12.64 | −23.08 | — |

This final test has therefore confirmed the greater freedom of movement of the optical fibres within the filler, an important parameter in relation to the reduction of the phenomena of bending of the optical fibres, which are harmful to the transmission of the signals.

EXAMPLE 4
Measurements of Flowing Resistance

The flowing test of the filling material according to the present invention is carried out to evaluate the tendency of said material to drip in the cable.

Table V shows the details of compositions evaluated by the applicant by means of flowing test. The first composition (A) is a filling material according to the present invention, based on internal polyolefin (MX2106), and the second (B) is a comparative filling material, based on polyalphaolefin (NEXBASE™ 2006).

TABLE V

Composition for fillers according to the invention

| COMPONENT (%) | (A) | (B) |
|---|---|---|
| MX 2106 | 91 | — |
| NEXBASE ™ 2006 | — | 91.3 |
| IRGANOX 1010 | 0.4 | 0.4 |
| KRATON G1702 | 8.6 | 8.3 |
| Viscosity (mPas) | 84.4 | 86.1 |

The dripping test of filling material consists in placing an annular shaped sample of each composition on the upper end of a aluminum plate 400×80×2 mm in dimensions.

Each annular sample has the following dimensions:

3±0.1 mm thickness;

36±0.1 mm internal diameter;

80±0.1 mm external diameter.

Each plate is then placed inside an oven whose temperature is regulated at about 200±3° C. with their principal plane inclined with respect to oven horizontal plane so as to form an angle of 60°.

The longest side of aluminum plate is provided with a scale for permitting the measurements of the distance that the head of each sample covers during the dripping test.

Once samples reach the temperature imposed inside the oven (at t=0, measurement of distances covered by the heads of samples begins and is registered at different subsequent times as reported in Table VI.

TABLE VI

Distances covered by two test pieces evaluated

| Time (minutes) | Distance (A) (mm) | Distance (B) (mm) |
|---|---|---|
| 11 | 1 | 1 |
| 16 | 10 | 10 |
| 19 | | 20 |
| 23 | | 30 |
| 25 | 20 | |
| 26 | | 40 |
| 30 | | 50 |
| 60 | 27 | 100 |

The results of flowing test clearly demonstrate that filling material according to the present invention shows an appreciable reduction of flowing with respect to the comparative filling material comprising similar polyalphaolefin base oil.

What is claimed is:

1. An optical cable comprising at least one optical fiber and a filling material wherein said filling material comprises an internal polyolefin oligomer based on an internal olefin monomer comprising the product of polymerization of two or more hydrocarbon monomeric units, where said monomeric units comprise a hydrocarbon chain having at least one unsaturation distributed randomly along the whole of said hydrocarbon chain, and said two or more monomeric units comprise a maximum of 10% of monomeric units having a double bond in an α-position.

2. Cable according to claim 1, characterized in that the filling composition comprises from 30% to 98% by weight of internal polyolefin.

3. Cable according to claim 1, wherein the filling composition comprises from approximately 45% to approximately 95% by weight of internal polyolefin.

4. Cable according to claim 1, characterized in that the filler is in contact with the said at least one optical fibre.

5. Cable according to claim 1, characterized in that the said internal polyolefin is produced by the polymerization of unsaturated hydrocarbon monomeric units, each containing from 10 to 20 carbon atoms.

6. Cable according to claim 5, wherein each of the said monomeric units contains from 12 to 18 carbon atoms.

7. Cable according to claim 5, wherein each of the said monomeric units contains from 15 to 16 carbon atoms.

8. Cable according to claim 5, wherein said internal polyolefin is an oligomer comprising from 2 to 4 unsaturated hydrocarbon monomeric units.

9. Optical cable according to claim 1 or 5, wherein said internal polyolefin is a mixture of polyolefins having different molecular weights.

10. Cable according to claim 9, characterized in that the said mixture of internal polyolefins is a mixture of oligomers, each comprising from 2 to 4 unsaturated hydrocarbon monomeric units.

11. Cable according to claim 1 or 2, characterized in that the said filler comprises a polymeric thickener.

12. Cable according to claim 11, characterized in that the said thickener is a block copolymer of the type which comprises styrene, propylene and ethylene units.

13. Cable according to claim 1 or 2, characterized in that the said filling mixture also comprises a mineral oil.

14. Cable according to claim 13, characterized in that the said mineral oil is a refined naphthenic oil.

15. Cable according to claim 14, characterized in that the said naphthenic oil has a viscosity in the range from 4 to 60 mPa.s, a viscosity in the range from 1.5 to 7 mPa.s at 100° C., and a pour point in the range from −60° C. to −25° C.

16. Optical cable according to claim 13, wherein said mineral oil in the filling mixture replaces the quantity of internal polyolefin for a percentage by weight which varies from 0% to 70%.

17. A composition for filling material for optical cables, comprising an internal polyolefin oligomer based on an internal olefin monomer comprising the product of polymerization of two or more hydrocarbon monomeric units, where said monomeric units comprise a hydrocarbon chain having at least one unsaturation distributed randomly along the whole of said hydrocarbon chain, and said two or more monomeric units comprises a maximum of 10% of monomeric units having a double bond in an α-position, said oligomer being combined with a polymeric thickener.

18. The composition of claim 17 wherein said thickener comprises a copolymer of styrene, propylene and ethylene.

19. The composition of claim 17 wherein said composition contains a mineral oil.

20. The composition of claim 18 wherein said composition contains a mineral oil.

21. The composition of any one of claims 17–20 and an antioxidant.

* * * * *